US009400975B2

(12) United States Patent
Griffin et al.

(10) Patent No.: US 9,400,975 B2
(45) Date of Patent: Jul. 26, 2016

(54) EVALUATING USER CONTACTS ON AN ELECTRONIC COMMUNICATION NETWORK

(71) Applicants: Keith Griffin, Oranmore (IE); Patrick C. Linskey, San Francisco, CA (US)

(72) Inventors: Keith Griffin, Oranmore (IE); Patrick C. Linskey, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 287 days.

(21) Appl. No.: 13/652,818

(22) Filed: Oct. 16, 2012

(65) Prior Publication Data

US 2014/0108565 A1    Apr. 17, 2014

(51) Int. Cl.
*G06Q 10/10*    (2012.01)
*G06Q 50/00*    (2012.01)

(52) U.S. Cl.
CPC .............. *G06Q 10/107* (2013.01); *G06Q 50/01* (2013.01)

(58) Field of Classification Search
CPC .............. G06F 15/16; G06F 17/30864; G06F 17/30699; G06Q 10/10; G06Q 50/01; G06Q 10/00; G06Q 10/063; G06Q 30/0273; G06Q 30/02; G06Q 10/063112
See application file for complete search history.

(56) References Cited

U.S. PATENT DOCUMENTS 8,234,272 B2    7/2012  Kretz et al.
8,606,792 B1 *  12/2013 Jackson et al. ................ 707/748
2011/0040787 A1 *  2/2011  Cierniak ........... G06F 17/30312
                                                        707/770
2012/0124192 A1 *  5/2012  Daoud et al. .................. 709/224
2012/0166453 A1 *  6/2012  Broder ........................... 707/752
2012/0331418 A1    12/2012 Bonforte
2013/0246518 A1    9/2013  Nace

OTHER PUBLICATIONS

Tom Barrett, "Introducing Google Docs to Your Class: Tips for introducing online collaboration to students 1 of3," *edte.ch/blog*, edte.ch/blog/2011/07/31/introducing-google-docs-to-your-class- tips-for-introducing-online-collaroration-to-students-1-of-3/, Jul. 31, 2011, 2 pages.

* cited by examiner

*Primary Examiner* — Wing F Chan
*Assistant Examiner* — Padma Mundur
(74) *Attorney, Agent, or Firm* — Baker Botts L.L.P.

(57) ABSTRACT

A system for evaluating network users comprises one or more processors communicatively coupled to one or more memories operable to receive, over a network comprising a plurality of network users, electronic first user content generated by a first user, provide the first user content over the network to a second user, receive, over the network, a second user response to the first user content generated by the second user, determine a second user response delay time for the second user response, wherein the second user response delay time is associated with the amount of time between when the first user content was provided over the network and when the second user response was received, and generate a first list of network users that have responded to first user content, wherein the first list is organized based at least in part on the second user response delay time.

14 Claims, 4 Drawing Sheets

FIG. 1

| CONTENT ID | CONTENT FORMAT | CONTENT USER | CONTENT LOAD TIME | RESP. ID | RESP. FORMAT | RESP. VALUE | RESP. USER | RESP. LOAD TIME | RESP. DELAY | RESP. USER FREQ. | ORGANIZATION RANK |
|---|---|---|---|---|---|---|---|---|---|---|---|
| U1-001 | DOC | USER 1 | 05/07/2015 10:18:03 AM | 001 | COMMENT | 4 | USER 2 | 05/07/2015 10:52:21 AM | 00:34:18 | 10 | 2 |
| U3-001 | IM | USER 3 | 12/27/2015 3:29:32 PM | 001 | IM | 2 | USER 4 | 12/27/2015 3:30:07 PM | 00:00:35 | 25 | 4 |
| U5-001 | VIDEO | USER 5 | 12/31/2015 1:00:21 PM | 015 | COMMENT | 2 | USER 6 | 12/31/2015 1:14:16 PM | 00:13:55 | 4 | 2 |

EVALUATING USER CONTACTS ON AN ELECTRONIC COMMUNICATION NETWORK

TECHNICAL FIELD

This invention relates generally to communication networks, and more particularly to evaluating user contacts on an electronic communications network.

BACKGROUND

Electronic communications networks often include a plurality of users. Users may have connections to other users on the network. For example, a user may have personal relationships, business relationships, contact information, or other connection to other network users. A user's connections on a network may be referred to as the user's contacts. Users often maintain an electronic database of their network contacts (e.g., contact list, address book, etc.).

In particular situations, users collaborate using electronic communication networks. For example, a user may load content, such as a document, onto the communication network such that the user's contacts may access the content. The user's contacts may collaborate with the user by responding to the content. For example, one or more of the user's contacts may respond to the content by making an electronic communication associated with the content (e.g., a comment, an edit, etc.).

BRIEF DESCRIPTION OF THE DRAWINGS

To provide a more complete understanding of the present disclosure and the features and advantages thereof, reference is made to the following description taken in conjunction with the accompanying drawings, in which.

DETAILED DESCRIPTION

Overview

The teachings of the present disclosure relate to a system for evaluating network users comprising one or more processors communicatively coupled to one or more memories, the one or more processors operable to receive electronic first user content generated by a first user, provide the first user content over the network to a second user, receive over the network an electronic second user response to the first user content generated by the second user, determine a second user response delay time for the second user response wherein the second user response delay time is associated with the amount of time between when the first user content was provided over the network and when the second user response was received, and generate a first list of network users that have responded to first user content wherein the first list is organized based at least in part on the second user response delay time.

In certain embodiments, one or more processors communicatively coupled to a memory storing an electronic database of a user's contacts on an electronic communication network are operable to organize the database of contacts according to a time difference between when an item of content generated by the user was loaded onto the network and when one or more contacts responded to the content, thereby conserving the computational resources and bandwidth consumed by the user searching an unorganized database of contacts.

In one embodiment, one or more processors communicatively coupled to a memory storing an electronic database of a user's contacts on an electronic communication network are operable to organize the database of contacts according to the number of responses made by one or more contacts to content generated by the user, thereby conserving the computational resources and bandwidth consumed by the user searching an unorganized database of contacts.

In another embodiment, one or more processors communicatively coupled to a memory storing an electronic database of a user's contacts on an electronic communication network are operable to organize the database of contacts according to one or more values associated with one or more responses from the user's contacts to content generated by the user, thereby conserving the computational resources and bandwidth consumed by the user searching an unorganized database of contacts.

In yet another embodiment, one or more processors communicatively coupled to a memory storing an electronic database of a user's contacts on an electronic communication network are operable to organize the database of contacts according to a time difference between when an item of content generated by one or more of the user's contacts was loaded onto the network and when the user responded to the content, thereby conserving the computational resources and bandwidth consumed by the user searching an unorganized database of contacts.

In still yet another embodiment, one or more processors communicatively coupled to a memory storing an electronic database of a user's contacts on an electronic communication network are operable to organize the database of contacts according to the number of responses made by the user to content generated by the one or more of the user's contacts, thereby conserving the computational resources and bandwidth consumed by the user searching an unorganized database of contacts.

In a further embodiment, one or more processors communicatively coupled to a memory storing an electronic database of a user's contacts on an electronic communication network are operable to organize the database of contacts according to one or more values associated with one or more responses from the user to electronic content generated by one or more of the user's contacts, thereby conserving the computational resources and bandwidth consumed by the user searching an unorganized database of contacts.

In a still further embodiment, one or more processors communicatively coupled to a memory storing an electronic database of a user's contacts on an electronic communication network are operable to organize the database of contacts according to criteria received from the user, thereby conserving the computational resources and bandwidth consumed by the user searching an unorganized database of contacts for contacts responsive to the criteria.

Certain embodiments of the present disclosure may include some, all, or none of the above advantages. One or more other technical advantages may be readily apparent to those skilled in the art from the figures, descriptions, and claims included herein.

DESCRIPTION OF EXAMPLE EMBODIMENTS

In an embodiment of operation of the present disclosure, an electronic communication network (e.g., a collaborative electronic social network) includes a plurality of network users. Users may have a plurality of contacts on the network (e.g., connections to other network users). In certain embodiments, users are associated with an electronic database that indentifies their contacts (e.g., a contact list or address book). Users may collaborate with their contacts on the network using electronic communications such as blogs, wikis, instant messages, e-mail, discussion forums, documents, presentations, spreadsheets, figures, charts, comments, edits, posts, chats, audio (e.g., live audio, such as telephone calls, or stored audio files), video (e.g., live video, such as teleconferencing, or stored video files), or any other suitable electronic communication format. For example, a user can make an electronic communication available over the network for one or more contacts. In certain embodiments, users interact with the network through social software environments associated with the network. Social software environments may facilitate communication over the network, collaboration over the network, or any other suitable functionality for the network.

An electronic communication generated by a user may be referred to as content, and making the content available over the network may be referred to as posting or loading content on the network. In certain embodiments, one or more of the user's contacts may respond to the content by making electronic communications associated with the content available over the network. An electronic communications made in response to an item of content may be referred to as a response. In certain embodiments, a response to an item of content may also be an item of content and users may respond to responses. Content and responses may form chains, or threads, that may have many branches.

In an embodiment, components of the network monitor the time when content and corresponding responses are loaded to the network. Components of the network may be operable to determine a time difference between when content was loaded to the network and when one or more responses to the content were loaded to the network. The time difference between the load times of content and corresponding responses may be referred to as the response delay time. In an embodiment, components of the network are operable to monitor the number of responses made to content generated by a user by one or more contacts of the user. The number of responses made by a contact of a user to content generated by the user may be referred to as a response frequency. Components of the network may further be operable to evaluate an item of content or a response according to particular criteria to generate a value associated with the content or response. In certain embodiments, the value may be based on one or more of the following: the size of the content or response (e.g., file size, word count, character count, page count, time length, or other suitable size measurement), the words used in the content or response, response delay time (e.g., the time difference between content being available to a user and the user responding to the content, the time difference between when a user accessed content and when the user responded to the content, or any other time suitable time difference between an item of content and a corresponding response), a number of responses that pre-date a response, a number of responses to a response (e.g., a communication thread where users can respond to responses), the user that generated content or a response, the format of electronic communication used for the content or response (e.g., comment, edit, instant message, teleconference, etc), and any other suitable valuation metric.

Components of the network may be operable to organize a user's contacts in an electronic database according to particular criteria. For example, a user's contacts may be organized based on one or more of response delay times of one or more contacts, response delay times of the user, response frequency of one or more contacts, response frequency of the user, a value associated with a response from one or more contacts, a value associated with a response from the user, a value associated with one or more items of content, and any other suitable criteria. In certain embodiments, a user selects the criteria used to organize their contact list.

Components of the network may be operable to display a user's contact list in one or more formats. For example, components of the network may display a contact list as a list, chart, graph, diagram, or other suitable display format. In certain embodiments, a user selects the display format of their contact list. A contact list may be displayed to illustrate relationships between a user and their contacts, for example, the contacts that are most responsive to the user or the contacts the user is most responsive to, where responsiveness can be based on any suitable criteria.

Figure 1:
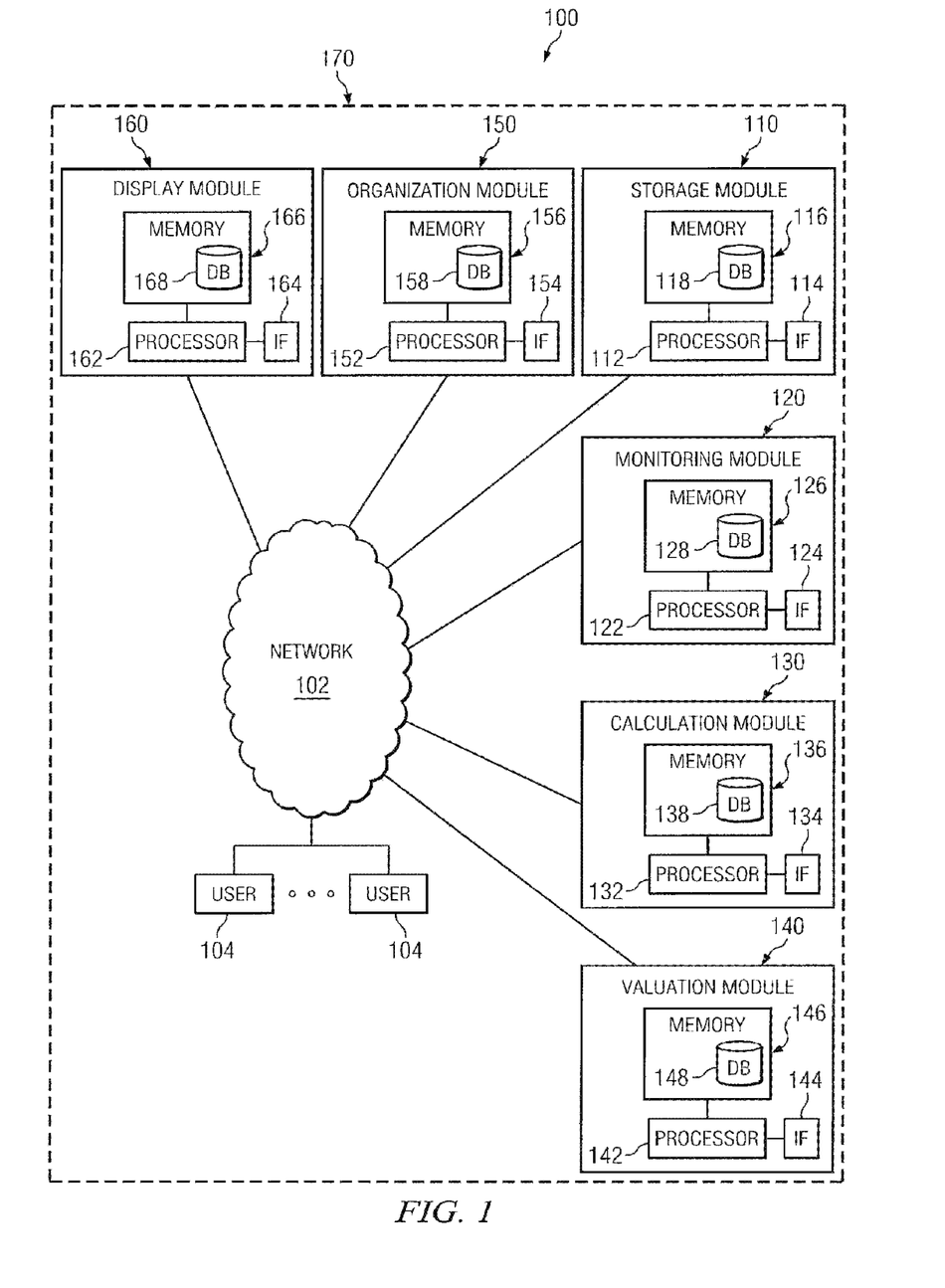
FIG. 1 is a block diagram illustrating an embodiment of a system for organizing an electronic database of users of an electronic communication network.

FIG. 1 is a block diagram illustrating an embodiment of a system for organizing an electronic database of users of an electronic communications network. According to an embodiment, system 100 includes network 102, network users 104, storage module 110, monitoring module 120, valuation module 130, calculation module 140, organization module 150, display module 160, and enterprise 170.

Electronic communications network 102 represents any suitable network operable to facilitate communication between components of system 100, such as network users 104, storage module 110, monitoring module 120, calculation module 130, valuation module 140, organization module 150, display module 160, and enterprise 170. Network 102 may include any interconnecting system capable of transmitting audio, video, electrical signals, optical signals, data, messages, or any combination of the preceding. Network 102 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100. In certain embodiments, network 102 represents an electronic collaborative social network.

Network users 104 represent entities with access to network 102. Users 104 may include persons or groups of persons (e.g., a business, an organization, a government, a government agency, or any other entity). Users 104 may be associated with a plurality of network contacts (e.g., other network users 104). In certain embodiments, users 104 are associated with an electronic database of contacts (e.g., contact list). A contact list may include contact information (e.g., e-mail address, physical address, telephone number, etc) or other profile information (e.g., company, department, title, education information, etc) for contacts of a user 104.

In certain embodiments, users 104 can make electronic communications available to one or more contacts over network 102, which may be referred to as posting, or loading, content on network 102. Electronic communications may be text based, such as electronic blogs, wikis, instant messages, e-mail, discussion forums, documents, presentations, comments, edits, posts, chats or other text based electronic communication format, or may be non-text based, such as video (e.g., teleconferencing, live video, or stored video), audio (e.g., telephone calls, live audio, or stored audio), or other non-texted based electronic communication format. Contacts may respond to content posted by user 104 with electronic communications responding to the content (e.g., responses). For example, user 104 may load an item of content, such as a document, onto network 102 so that one or more contacts can access the content. Contacts may respond to the content by loading responses associated with the content to network 102. For example, contacts may make edits to the document, add comments to the document, place a call to the user 104 who generated the document, attach other documents or figures to the document, or any other suitable electronic communication responding to the document.

Storage module 110 represents a component operable to store data for system 100. For example, storage module 110 may store electronic communications, such as content and responses, loaded by users 104. In certain embodiments storage module 110 associates responses with corresponding content and associates users 104 with content and responses. Storage module 110 may further be operable to identify the electronic communication format of items of content and responses. Storage module 110 may receive and store data generated by other components. For example, storage module 110 may receive information generated by monitoring module 120, calculation module 130, valuation module 140, organization module 150, or display module 160.

In certain embodiments, storage module 110 stores data associated with users 104. For example, storage module 110 may store the amount of content generated by a user 104, the number of responses generated by a user 104, the number of responses made by a user 104 to particular items of content, the number of responses made by a user 104 to particular users 104, valuations of content or responses generated by a user 104, or any other suitable information relating to a user 104. Storage module 110 may store data associated with content or responses. For example, storage module 110 may store an identifier associated with an item of content or a response, the electronic communication format of an item of content or a response (e.g., document, spreadsheet, chart, video, etc), one or more times associated with an item of content or a response (e.g., the times associated with when the content or response was loaded to network 102, made accessible to users 104, viewed by users 104, responded to by users 104, deleted, or any other relevant time), or other suitable information related to content or responses. In certain embodiments, storage module 110 may include processor 112, interface 114, memory 116, and database 118.

Monitoring module 120 represents a component operable to monitor events on network 102. In certain embodiments, monitoring module 120 may track and/or record times associated with events related to users 104, content, or responses. For example, monitoring module 120 may track and/or record the time an item of content or a response is loaded onto network 102, the time an item of content or a response is made available to users 104, the time an item of content or response is accessed by a user 104, or any other suitable event relating to users 104, content, or responses. Monitoring module 120 may monitor events on network 102 at any suitable time. For example, monitoring module 120 may monitor events as they occur (e.g., in real time) or may monitor events after they occur (e.g., data mining content or responses). In an embodiment, network events (e.g., content, responses, or other event) are recorded throughout the day (e.g., by storage module 110), and monitoring module 120 mines the records at the end of the day for information such as the time an item of content or a response is loaded onto network 102, the time an item of content or a response is made available to users 104, the time an item of content or response is accessed by a user 104, or any other suitable event relating to users 104, content, or responses. In certain embodiments, monitoring module 120 may include processor 122, interface 124, memory 126, and database 128.

Calculation module 130 represents a component operable to perform calculations for system 100. Calculation module 130 may calculate the difference in times monitored by monitoring module 120. For example, calculation module 130 may calculate the time difference between when an item of content was loaded to network 102 and when users 104 made responses to the content, the time difference between when users 104 accessed the content and when users 104 made responses to the content, or the time difference between any suitable event relating to users 104, content, or responses. In certain embodiments, calculation module 130 may calculate information relating to users 104. For example, calculation module 130 may calculate the amount of content generated by a user 104, the number of responses made by a user 104, the number of responses made by a user 104 to particular items of content, the number of responses made by a user 104 to particular other users 104, or any other suitable information relating to a user 104, content, or responses. Calculation module 130 may include processor 132, interface 134, memory 136, and database 138.

Valuation module 140 represents a component operable to evaluate content or responses based on particular criteria. For example, valuation module 140 may evaluate content or responses based on one or more of the following: the size of the content or response (e.g., file size, word count, character count, page count, time length, or other suitable size measurement), the words used in the content or response, response delay time (e.g., the time difference between content being available to a user 104 and the user 104 responding to the content, the time difference between when a user 104 accessed content and when the user 104 responded to the content, or any other time suitable time difference between an item of content and a corresponding response), a number of responses that pre-date a response, a number of responses to a response (e.g., a communication thread where users can respond to responses), the user 104 that generated content or a response, the format of electronic communication used for the content or response (e.g., comment, edit, instant message, teleconference, etc), and any other suitable valuation metric. In certain embodiments, valuation module 140 is operable to utilize one or more of the following to evaluate content or responses: natural language processing, computational linguistics, text analytics, sentiment analysis, active speaker tracking, or any other suitable language analysis.

In an embodiment, valuation module 140 is operable to identify potentially misleading responses. For example, a user 104 may load a large document onto network 102 and a contact may post a response to the document less than a minute after the document was loaded. The response may indicate that the contact has read the document and approved it. Valuation module 140 may recognize that, due to the size of the document, the short time the document was available to the contact before the contact responded, and the words used in the response (indicating that the contact had read the document) that the response may be misleading. In certain embodiments, valuation module 140 will de-value content or responses identified as misleading. Valuation module 140 may include processor 142, interface 144, memory 146, and database 148.

Organization module 150 represents a component operable to organize a contact list associated with a user 104 based on particular criteria. Organization module 150 may organize a contact list based on one or more of the following: one or more response delay times associated with a contact (e.g., a time between when the user 104 loaded content to network 102 and when the contact responded to the content), the response frequency of one or more contacts (e.g., the number or responses made by a contact to content posted by the user 104), a value associated with one or more responses from a contact (e.g., a value determined by valuation module 140), and any other suitable criteria. In certain embodiments, criteria used to organize a contact list is received from the user 104 associated with the contact list. Organization module 150 may include processor 152, interface 154, memory 156, and database 158.

Display module 160 represents a component operable to generate displays of the contacts of a user 104. In certain embodiments, display module 160 generates displays that illustrate the organization of a contact list (e.g., the organization generated by organization module 150). In certain embodiments, display module 160 displays the contacts that are most responsive to a user 104 or the contacts the user 104 is most responsive to, where responsiveness can be determined based on any suitable criteria, for example, response delay time, number of responses (e.g., response frequency), a value associated with one or more responses, and any other suitable criteria. Display module 160 may display contact lists in any suitable fashion, for example, a list, a chart, a diagram, or other suitable display. In certain embodiments, display module 160 receives criteria from a user 104 indicating a display type for a contact list or particular user-contact relationships to display in a contact list. Display module 160 may include processor 162, interface 164, memory 166, and database 168.

Enterprise 170 represents an organization that may operate system 100. In an embodiment, enterprise 170 includes network 102, network users 104, storage module 110, monitoring module 120, valuation module 130, calculation module 140, organization module 150, and display module 160. Enterprise 170 may be any suitable type of entity (e.g., business, government, non-profit, etc.). In an embodiment, enterprise 170 has different business units, or subdivisions that handle different business activities.

A module (e.g., modules 110, 120, 130, 140, 150, and 160) may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of a module may be performed by any suitable combination of one or more servers or other components at one or more locations. In certain embodiments, one or more components of modules (e.g., processors, interfaces, memories, and databases) may be shared with other modules. In embodiments where modules represent a server, the server may be a private server, and the server may be a virtual or physical server. Additionally, a module may include any suitable component that functions as a server.

Components of system 100, such as storage module 110, monitoring module 120, valuation module 130, calculation module 140, organization module 150, and display module 160, may include one or more processors. A processor represents any computing device, such as processors 112, 122, 132, 142, 152, and 162, configured to control the operation of one or more components of system 100. A processor may comprise one or more processors and may be a programmable logic device, a microcontroller, a microprocessor, any suitable processing device, or any suitable combination of the preceding. A processor includes any hardware or software executing therein that operates to control and process information received by a component of system 100. In certain embodiments, a processor communicatively couples to other components of system 100, such as a module (e.g., modules 110, 120, 130, 140, 150, and 160), an interface (e.g., interfaces 114, 124, 134, 144, 154, and 164), a memory (e.g., memories 116, 126, 136, 146, 156, and 166), a database (e.g., databases 118, 128, 138, 148, 158, and 168), or any other suitable component.

An interface represents any device, such as interfaces 114, 124, 134, 144, 154, and 164, operable to receive input, send output, process the input or output, or perform other suitable operations for a component of system 100. An interface includes any port or connection, real or virtual, including any suitable hardware or software executing therein, including protocol conversion and data processing capabilities, to communicate through network 102. In certain embodiments, an interface includes a user interface (e.g., physical input, graphical user interface, touchscreen, buttons, switches, transducer, or any other suitable method to receive input from a user).

A memory represents any device, such as memories 116, 126, 136, 146, 156, and 166, operable to store, either permanently or temporarily, data, operational software, or other information for a processor. Memory includes any one or a combination of volatile or non-volatile local or remote devices suitable for storing information. For example, a memory may include random access memory (RAM), read only memory (ROM), magnetic storage devices, optical storage devices, semiconductor storage devices, or any other suitable information storage device or a combination of these devices. A memory may include any suitable information for use in the operation of component of system 100. A memory may further include some or all of one or more databases (e.g., databases 118, 128, 138, 148, 158, and 168).

Logic may perform the operation of any component of system 100, for example, logic executes instructions to generate output from input. Logic may include hardware, software executing therein, or other logic. Logic may be encoded in one or more non-transitory, tangible media, such as a computer-readable medium or any other suitable tangible medium, and may perform operations when executed by a computer or processor. Certain logic, such as a processor, may manage the operation of a component.

In an embodiment of operation of system 100, storage module 110 receives one or more items of content from a user 104 and one or more responses to the one or more items of content from one or more contacts of user 104. Monitoring module 120 monitors one or more times associated with the content and responses. Monitoring module 120 may store monitored times in storage module 110. Monitoring module 120 may monitor one or more of the following: the time an item of content was loaded onto network 102 by the user 104, the time an item of content was accessible by one or more contacts of the user on network 102, the time the one or more contacts accessed an item of content, the time the one or more contacts responded to an item of content a user 104 associated with an item of content or response, or any other suitable criteria.

Calculation module 130 calculates other data associated with users 104, content, and responses. Calculation module 130 may perform calculations based on data stored in storage module 110 and may store the results of calculations in storage module 110. For example, calculation module 130 may calculate one or more of the following: the time difference between when an item of content was loaded to network 102 and when users 104 made responses to the content, the time difference between when users 104 accessed the content and when users 104 made responses to the content, or the time difference between any suitable event relating to users 104, content, or responses, the amount of content generated by a user 104, the number of responses made by a user 104, the number of responses made by a user 104 to particular items of content, the number of responses made by a user 104 to particular other users 104, or any other suitable information relating to a user 104, content, or responses.

Valuation module 140 evaluates content or responses based on certain criteria. In certain embodiments, valuation module 140 receives evaluation criteria from a user 104. Evaluation module 140 may access content or responses stored in storage module 110 and generate valuations for the content or responses. In an embodiment, valuation module 140 stores valuations in storage module 110. Valuation module 140 may use one or more of the following criteria to evaluate content or responses: the size of the content or response (e.g., file size, word count, character count, page count, time length, or other suitable size measurement), the words used in the content or response, response delay time (e.g., the time difference between content being accessible by a user 104 and the user 104 responding to the content, the time difference between when a user 104 accessed content and when the user 104 responded to the content, or any other suitable time difference between an item of content and a corresponding response), a number of responses that pre-date a response, a number of responses to a response (e.g., a communication thread where users can respond to responses), the user 104 that generated content or a response, the format of electronic communication used for the content or response (e.g., comment, edit, instant message, teleconference, etc), and any other suitable valuation metric.

Organization module 150 organizes the contact list of the user 104 based on certain criteria. In certain embodiments, organization module 150 receives organization criteria from a user 104. Organization module 150 may access contact lists stored in storage module 110 and generate one or more organized versions of the contact lists based on the organization criteria. In an embodiment, organization module 150 stores organized versions of contact lists in storage module 110. Organization module 150 may use one or more of the following criteria to organize contact lists: one or more response delay times associated with a contact (e.g., a time between when the user 104 loaded content to network 102 and when the contact responded to the content), the number or responses made by a contact to content posted by the user 104 (e.g., response frequency), a value associated with one or more responses from a contact (e.g., a value determined by valuation module 140), and any other suitable criteria. In certain embodiments, organization module organizes the contact list of the user 104 based on contacts that are most responsive to the user (in terms of response delay time, response frequency, and/or response value). In another embodiment, organization module organizes the contact list of a user 104 based on the contacts that the user 104 is most responsive to (in terms of response delay time, response frequency, and/or response value). Organization module 150 may organize the contact list of the user 104 according to any one or more selected communication formats (e.g., forums, IMs, posts, etc) or according to any one or more selected criteria (e.g., response delay time, response frequency, response value, etc).

Display module 160 displays the contact list organized by organization module 150. Display module 160 may display the contact list in any suitable fashion, and in certain embodiments displays the contact list according to criteria selected by the user 104. In certain embodiments, display module 160 displays the contacts that are most responsive to a user 104 or the contacts the user 104 is most responsive to, where responsiveness can be determined based on any suitable criteria, for example, response delay time, number of responses (e.g., response frequency), a value associated with one or more responses, and any other suitable criteria.

Modifications, additions, or omissions may be made to system 100. System 100 may include more, fewer, or other components. Any suitable component of system 100 may include a processor, interface, logic, memory, or other suitable element. Any component of system 100 may communicate with any other component of system 100 over network 102. A response to an item of content may be in a format different from the item of content. Contacts may represent any network user 104. In an embodiment, any user 104 may be able to view the contacts any selected user 104 is most responsive to, or the contacts who are most responsive to any selected user 104.

In an embodiment, network 102 of system 100 is an electronic collaborative social network. One or more components of system 100 may be operable to run in a social software environment for network 102. In an embodiment, the social software environment facilitates one or more functionalities such as communication, collaboration, searching, monitoring (e.g., metrics such as response delay times, response frequency, etc), data storage, or any other suitable functionality on network 102. A social network may support any suitable form of communication (e.g., text based communication such as blogs, wikis, instant messages, e-mail, discussion forums, documents, presentations, comments, edits, posts, chats and non-text based communication such as video (e.g., teleconferencing, live video, or stored video), audio (e.g., telephone calls, live audio, or stored audio)).

Figure 2:
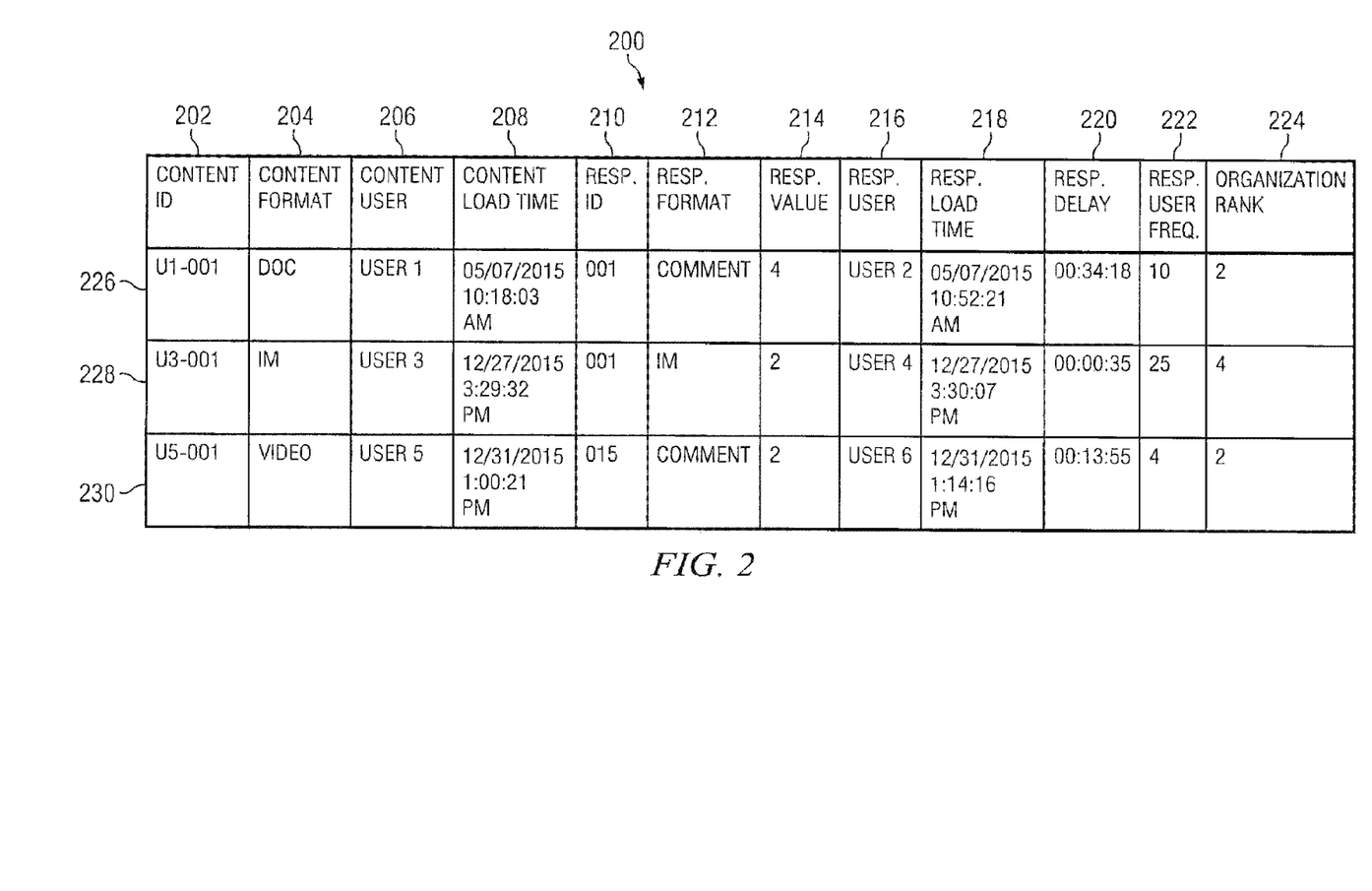
FIG. 2 is a table illustrating an embodiment of database fields used to organize an electronic database of users of an electronic communication network.

FIG. 2 is a table illustrating an embodiment of database fields used to organize an electronic database of users of an electronic communications network 102 (e.g., a contact list). In the illustrated embodiment, table 200 includes content ID field 202, content format field 204, content user field 206, content time field 208, response ID field 210, response format field 212, response value field 214, responding user field 216, response time field 218, response delay field 220, user response frequency field 222, and organization field 224.

Content ID field 202 represents an identifier associated with an item of content loaded to network 102. In certain embodiments, the content ID field 202 is used to associate items of content with corresponding responses, for example, communication threads of related content and responses. Content format field 204 represents the format of electronic communication used for an item of content. Particular types of electronic communication include text based communications, such as electronic blogs, wikis, instant messages, e-mail, discussion forums, documents, presentations, comments, edits, posts, chats, or other text based electronic communication format, or non-text based communications, such as video (e.g., teleconferencing, live video, or stored video), audio (e.g., telephone calls, live audio, or stored audio), or other non-texted based electronic communication format. Content user field 206 represents an identification of a user 104 associated with an item of content. Content load time field 208 represents the time an item of content is loaded onto network 102. Response ID field 210 represents an identifier associated with a response loaded to network 102. Response format field 212 represents the electronic communication format of the response identified by response ID field 210. Response value field 214 represents a value associated with the response identified by response ID field 210 (e.g., a value determined by valuation module 140). Response user field 216 represents an identification of a user 104 (e.g., a contact) associated with a response. Response load time field 218 represents the time a response is loaded onto network 102. Response delay time field 220 represents the time difference between response load time field 218 and content load time field 208. Response user frequency field 222 represents the number of responses by the response user identified in field 216 to content generated by the user identified in field 206. Organization rank field 224 represents the current rank of the user identified by field 216 in a contact list of the user identified by field 206 based on currently organization criteria.

In the illustrated embodiment, row 226 relates to content with a content ID 202 of content U1-001. The content format 204 of content U1-001 is a document, the content user 206 associated with content U1-001 is User1, and the content load time 208 associated with content U1-001 is 10:18:03 AM May 7, 2015. Content U1-001 is associated with at least one response identified by a response ID 210 of 001. The response format 212 of response 001 is a comment, the response user 216 associated with response 001 is User2, and the response load time 218 associated with response 001 is 10:52:21 AM May 7, 2015. The response delay 220 between the content load time 208 associated with content U1-001 and the response load time 218 associated with response 001 is 00:34:18. User response frequency 222 for row 226 is 10, indicating that response 001 is the 10th response by User2 to content associated with User1. Organization rank 224 for row 226 is 2, indicating that User2 is ranked 2nd on a contact list associated with User1 based on the current organization criteria applied to the contact list.

In the illustrated embodiment, row 228 relates to content with a content ID 202 of U3-001. The content format 204 of U3-001 is an instant message, the content user 206 associated with content U3-001 is User3, and the content load time 208 associated with content U3-001 is 03:29:32 PM Dec. 27, 2015. Content U3-001 is associated with at least one response identified by a response ID 210 of 001. The response format 212 of response 001 is an instant message, the response user 216 associated with response 001 is User4, and the response load time 218 associated with response 001 is 03:30:07 Dec. 27, 2015. The response delay time 220 between the content load time 208 associated with content U3-001 and the response load time 218 associated with response 001 is 00:00:35. User response frequency 222 for row 228 is 25, indicating that response 001 is the 25th response by User4 to content associated with User3. Organization rank 224 for row 228 is 4, indicating that User4 is ranked 4th on a contact list associated with User3 based on the current organization criteria applied to the contact list.

In the illustrated embodiment, row 230 relates to content with a content ID 202 of U5-001. The content format 204 of U5-001 is video, the content user 206 associated with content U5-001 is User5, and the content load time 208 associated with content U5-001 is 01:00:21 PM Dec. 31, 2015. Content U5-001 is associated with at least one response identified by a response ID 210 of 015. The response format 212 of response 015 is a comment, the response user 216 associated with response 015 is User6, and the response load time 218 associated with response 015 is 01:14:16 PM Dec. 31, 2015.

The response delay time between the content load time 208 associated with content U5-001 and the response load time 218 associated with response 015 is 00:13:55. User response frequency 222 for row 230 is 2, indicating that response 015 is the 2nd response by User6 to content associated with User5. Organization rank 224 for row 230 is 2, indicating that User6 is ranked 2nd on a contact list associated with User5 based on the current organization criteria applied to the contact list.

Modifications, additions, or omissions may be made to table 200. Table 200 may include more or fewer fields, and may include any information relevant to content, responses, users 104, electronic media 106, databases of users 104 of network 102, or other suitable criteria. Table 200 may include any suitable amount of information and may be stored in any suitable type or number of memories. In certain embodiments, table 200 further includes one or more of the following fields: the size of the content or response (e.g., file size, word count, character count, page count, time length, or other suitable size measurement), the words used in the content or response, another response delay time (e.g., the time difference between content being available to a user 104 and the user 104 responding to the content, the time difference between when a user 104 accessed content and when the user 104 responded to the content, or any other time suitable time difference between an item of content and a corresponding response), a number of responses that pre-date a response, a number of responses to a response (e.g., a communication thread where users can respond to responses), and any other suitable valuation metric.

Figure 3:
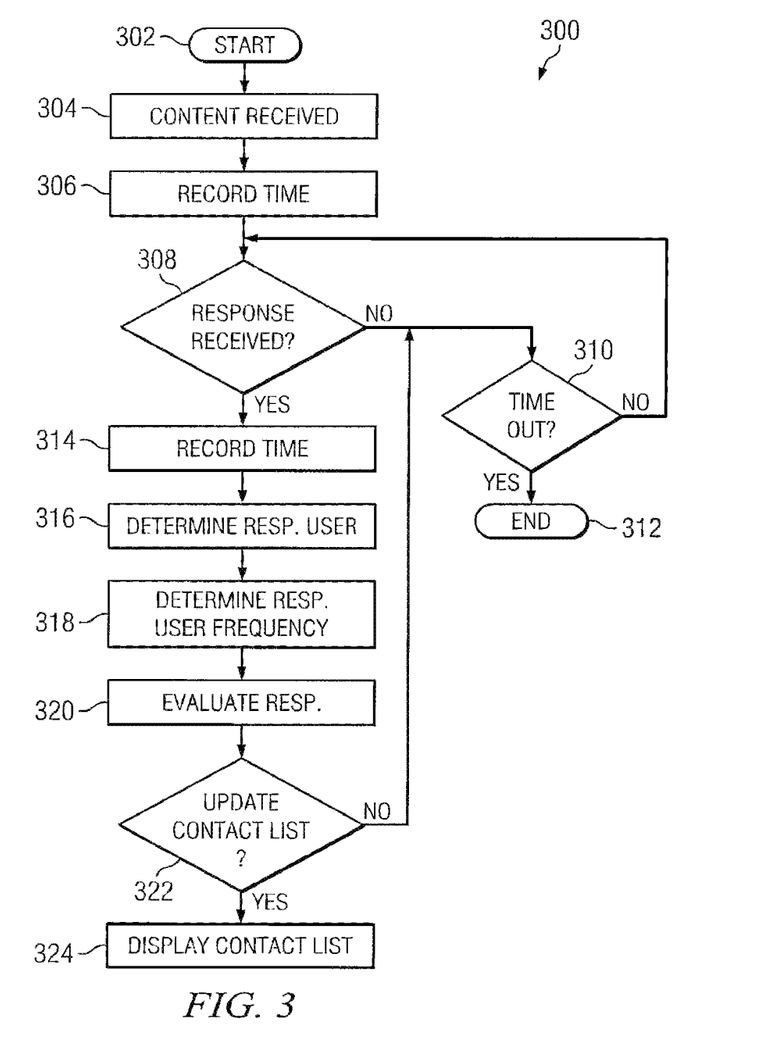
FIG. 3 is a flow chart illustrating an embodiment of a method for organizing an electronic database of users of an electronic communication network.

FIG. 3 is a flow chart illustrating an embodiment of a method for organizing an electronic database of users of an electronic communications network 102. Method 300 begins at step 302. At step 304, system 100 receives an item of content from a user 104. At step 306 a load time associated with the content is recorded. At step 308, system 100 determines whether a response corresponding to the content has been received, for example, from a contact of user 104.

If a response has not been received at step 308, the method continues at step 310 and system 100 determines whether to time out, for example, because a pre-set time in which to receive a response has expired or other suitable event. If system 100 determines to time out, the method ends at step 312. If system 100 determines not to time out, the method returns to step 308 and system 100 determines whether a response corresponding to the content has been received.

If a response has been received at step 308, the method continues at step 314 and system 100 records a load time associated with the response. At step 316, system 100 determines a user 104 associated with the response, for example, the user 104 that generated the response. At step 318, system 100 determines the number of responses made by the user 104 determined at step 316 to content generated by the user 104 that generated the content at step 304. At step 320, system 100 evaluates the response to determine a value associated with the response. The value may be based on one or more of the following: the size of the content or response (e.g., file size, word count, character count, page count, time length, or other suitable size measurement), the words used in the content or response, response delay time (e.g., the time difference between content being available to a user 104 and the user 104 responding to the content, the time difference between when a user 104 accessed content and when the user 104 responded to the content, or any other time suitable time difference between an item of content and a corresponding response), a number of responses that pre-date a response, a number of responses to a response (e.g., a communication thread where users can respond to responses), the user 104 that generated content or a response, the format of electronic communication used for the content or response (e.g., comment, edit, instant message, teleconference, etc), and any other suitable valuation metric.

At step 322, system 100 determines whether to update the organization of a contact list associated with the user 104 that generated the content at step 304. If system 100 determines to update the contact list, the method moves to step 324 and system 100 updates the contact list. If system 100 determines not to update the contact list, the method moves to step 310. System 100 may use any suitable criteria to make the determination of whether to update the organization of the contact list, for example, a period of time between updates of the list, a number of responses between updates of the list, a threshold value for one or more responses, a threshold response delay time for one or more responses, a threshold number of responses made to one or more items of content by one or more contacts, or any other suitable criteria.

Modifications, additions, or omissions may be made to method 300. The method may include more, fewer, or other steps. Additionally, the steps may be performed in any suitable order. Any suitable component of system 100 may perform one or more steps of method 300.

Figure 4:
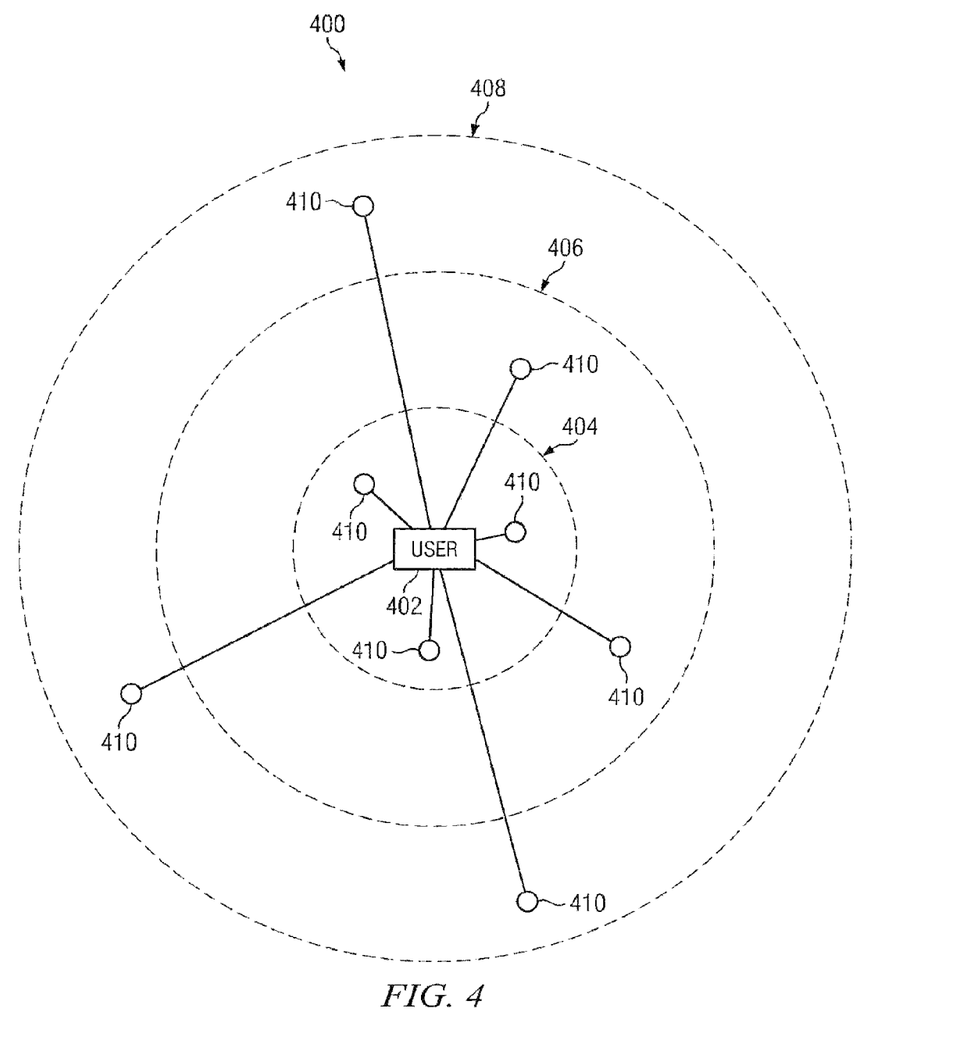
FIG. 4 is a graph illustrating an embodiment of an organization of an electronic database of users of an electronic communications network.

FIG. 4 is a graph 400 illustrating an embodiment of an organization of an electronic database of users of an electronic communications network 102. In the illustrated embodiment, graph 400 represents an illustration of contacts 410 of a user 402 based on contact response delay times to items of content generated by the user 402. Graph 400 may illustrate any suitable relationship between a user 402 and their contacts 410 (e.g., contact response frequency, contact response value, user response delay times for content generated by contacts, user response frequency to content generated by contacts, and user response value to content generated by contacts). For example, graph 400 may display the contacts 410 that user 402 is most responsive to based on one or more of the above referenced criteria.

Graph 400 includes user 402, first boundary 404, second boundary 406, third boundary 408, and contacts 410. Contacts 410 represent network users 402 that are contacts of user 402. Contacts 410 inside boundary 404 represent the contacts 410 of the user 402 with the lowest response delay times. Contacts 410 inside boundary 406 represent the contacts 410 of user 402 with response delay times greater than the contacts 410 inside boundary 404, but less than the response delay times of the contacts outside boundary 406. Contacts 410 inside boundary 408 represent the contacts 410 of user 402 with response delay times greater than the contacts 410 inside boundary 406. The number of contacts 410 inside a particular boundary can be based on any suitable criteria such as one or more of the following: a fixed number for each boundary, a standard deviation, or a threshold average response delay time.

Modifications, additions, or omissions may be made to graph 400. Graph 400 may include any suitable number of contacts 410, users 402, and boundaries, and may illustrate any suitable relationship between a user 402 and their contacts 410. Graph 400 may display all users 402 in network 102, or a selected subset of users 402 in network 102. In certain embodiments, graph 400 represents the organization of contacts generated by organization module 150. Graph 400 may illustrate relationships between a user 402 and their contacts 410 in any suitable fashion and may include any type of graph, chart, diagram, or other display.

In certain embodiments, graph 400 may display relationships from the perspective of multiple users 402. For example, graph 400 may display a network 102 of users 402, and selection of any one of the users 402 can cause the display of other network users 402 to align based on their responsiveness to the selected user. Similarly, selection of any user 402 may cause the display of other network users 402 to align based on the selected user's responsiveness to the other network users 402. Responsiveness may be based on any suitable criteria, for example, response delay times, number of responses (e.g., response frequency), a value associated with one or more responses, and any other suitable criteria.

In an embodiment, graph 400 may display relationships of all users 402 displayed on graph 400. For example, in the illustrated embodiment, instead of displaying graph 400 from the perspective of a single user, all relationships between displayed users 402 can be displayed. The relationship connections can be based on both the responsiveness of a user 402 to a contact, and the contact's responsiveness to the user 402. In an embodiment, any user 402 may be able to view a display of the contacts any selected user 402 is most responsive to, or the contacts who are most responsive to any selected user 402.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for evaluating network users, comprising:
   receiving, over a network comprising a plurality of network users, electronic first user content generated by a first user;
   providing the first user content over the network to a second user;
   determining, by one or more processors, a first time associated with the second user accessing the first user content;
   receiving, over the network, an electronic second user response to the first user content generated by the second user;
   determining, by the one or more processors, a second time associated with receiving the electronic second user response;
   determining, by the one or more processors, a second user response delay time for the second user response based on the time difference between the first time and the second time;
   determining, by the one or more processors, a response value for the second user response, wherein the response value is based on the second user response delay time, the content of the second user response, the size of the second user response, and the response electronic communication format used for the second user response; and
   generating, by the one or more processors, a first list of network users that have responded to first user content, wherein the first list is organized based at least in part on the response value for the second user response.

2. The method of claim 1, further comprising:
   receiving, over the network, electronic third user content generated by a third user;
   providing the third user content over the network to the first user;
   determining, by the one or more processors, a third time associated with the third user accessing the first user content;

receiving, over the network, an electronic first user response to the third user content generated by the first user;
determining, by the one or more processors, a fourth time associated with receiving the electronic first user response;
determining, by the one or more processors, a first user response delay time for the first user response based on the time difference between the third time and the fourth time; and
generating, by the one or more processors, a second list of network users who have generated content to which the first user has generated a first user response, where in the second list is organized based at least in part on the first user response delay time.

3. The method of claim 1, further comprising:
determining, by the one or more processors, a response frequency for the second user, wherein response frequency is associated with the number of second user responses the second user has made to first user content; and
wherein the first list is organized based at least in part on the response frequency.

4. The method of claim 1, wherein the network includes a private enterprise network.

5. The method of claim 2, wherein at least one from the set comprising: the first user, the second user, and the third user represents a plurality of network users.

6. A system for evaluating network users, comprising:
an interface configured to:
receive, over a network comprising a plurality of network users, electronic first user content generated by a first user;
provide the first user content over the network to a second user; and
receive, over the network, an electronic second user response to the first user content generated by the second user; and
one or more processors configured to:
determine a first time associated with the second user accessing the first user content;
determine a second time associated with receiving the electronic second user response;
determine a second user response delay time for the second user response based on the time difference between the first time and the second time;
determine a response value for the second user response, wherein the response value is based on the second user response delay time, the content of the second user response, the size of the second user response, and the response electronic communication format used for the second user response; and
generate a first list of network users that have responded to first user content, wherein the first list is organized based at least in part on the response value for the second user response.

7. The system of claim 6, the interface further configured to:
receive, over the network, electronic third user content generated by a third user;
provide the third user content over the network to the first user; and
receive, over the network, an electronic first user response to the third user content generated by the first user; and
the one or more processors further operable to:
determine a third time associated with the third user accessing the first user content;
determine a fourth time associated with receiving the electronic first user response;
determine a first user response delay time for the first user response based on the time difference between the third time and the fourth time; and
generate a second list of network users who have generated content to which the first user has generated a first user response, where in the second list is organized based at least in part on the first user response delay time.

8. The system of claim 6, the one or more processors further configured to:
determine a response frequency for the second user, wherein response frequency is associated with the number of second user responses the second user has made to first user content; and
wherein the first list is organized based at least in part on the response frequency.

9. The system of claim 6, wherein the network includes a private enterprise network.

10. The system of claim 7, wherein at least one from the set comprising: the first user, the second user, and the third user represents a plurality of network users.

11. A non-transitory computer readable storage medium having instructions for evaluating users stored thereon, the instructions operable, when executed by one or more processors, to:
receive, over a network comprising a plurality of network users, electronic first user content generated by a first user;
provide the first user content over the network to a second user;
determine a first time associated with the second user accessing the first user content;
receive, over the network, an electronic second user response to the first user content generated by the second user;
determine a second time associated with receiving the electronic second user response;
determine a second user response delay time for the second user response based on the time difference between the first time and the second time;
determine a response value for the second user response, wherein the response value is based on the second user response delay time, the content of the second user response, the size of the second user response, and the response electronic communication format used for the second user response; and
generate a first list of network users that responded to first user content, wherein the first list is organized based at least in part on the response value for the second user response.

12. The non-transitory computer readable storage medium of claim 11, the instructions further operable to:
receive, over the network, electronic third user content generated by a third user;
provide the third user content over the network to the first user;
determine a third time associated with the third user accessing the first user content;
receive, over the network, an electronic first user response to the third user content generated by the first user;
determine a fourth time associated with receiving the electronic first user response;
determine a first user response delay time for the first user response based on the time difference between the third time and the fourth time; and generate a second list of network users who have generated content to which the first user has generated a first user response, wherein the second list is organized based at least in part on the first user response delay time.

13. The non-transitory computer readable storage medium of claim 11, the instructions further operable to:
determine a response frequency for the second user, wherein response frequency is associated with the number of second user responses the second user has made to first user content; and
wherein the first list is organized based at least in part on the response frequency.

14. The non-transitory computer readable storage medium of claim 11, wherein the network includes a private enterprise network.

* * * * *